United States Patent
Levy

(10) Patent No.: US 7,721,802 B2
(45) Date of Patent: May 25, 2010

(54) FLUID LEVEL SENSING DEVICE AND METHODS OF USING SAME

(76) Inventor: Warren Michael Levy, Andres Ferrerira 3276, La Lucila, Partido de Vicente Lopez, Buenos Aires (AR) B1636AOD ( * ) Notice: Subject to any disclaimer, the term of this patent is extended or adjusted under 35 U.S.C. 154(b) by 166 days.

(21) Appl. No.: 12/036,059

(22) Filed: Feb. 22, 2008

(65) Prior Publication Data

US 2008/0202745 A1 Aug. 28, 2008

Related U.S. Application Data

(60) Provisional application No. 60/891,374, filed on Feb. 23, 2007.

(51) Int. Cl.
*E21B 47/04* (2006.01)
*G01V 3/18* (2006.01)

(52) U.S. Cl. .............. 166/250.03; 73/64.55; 73/152.42; 324/324

(58) Field of Classification Search ............... 166/66, 166/250.01, 250.03, 252.4; 324/324, 341; 73/152.42, 152.55, 64.55
See application file for complete search history.

(56) References Cited

U.S. PATENT DOCUMENTS

| 2,517,603 A * | 8/1950 | Silverman ................. 73/152.41 |
|---|---|---|
| 2,973,477 A * | 2/1961 | Lerner ......................... 324/663 |
| 4,831,331 A * | 5/1989 | De et al. ...................... 324/338 |
| 4,910,998 A | 3/1990 | Willis et al. |
| 4,943,889 A | 7/1990 | Ohmatoi |
| 5,103,368 A | 4/1992 | Hart |
| 5,132,903 A * | 7/1992 | Sinclair ...................... 73/61.44 |
| 5,812,068 A | 9/1998 | Wisler et al. |
| 5,929,754 A | 7/1999 | Park et al. |
| 6,016,697 A | 1/2000 | McCulloch et al. |
| 6,098,020 A * | 8/2000 | den Boer ...................... 702/12 |
| 6,318,172 B1 | 11/2001 | Byatt et al. |

(Continued)

FOREIGN PATENT DOCUMENTS

WO WO03083415 10/2003

OTHER PUBLICATIONS

PCT International Search Report, PCT/CA2008/000324, mailed Jul. 24, 2008.

(Continued)

*Primary Examiner*—Kenneth Thompson
(74) *Attorney, Agent, or Firm*—Holme Roberts & Owen LLC

(57) ABSTRACT

A sensor used to determine the height of one or more fluids in a fluid column and to determine a location of an interface or boundary between a plurality of fluids in a fluid column is disclosed. The sensor includes a plurality of sensing elements comprising a capacitor and other components, such as resistors and inductors. The sensor also includes an oscillator that alters a frequency of an electrical current applied to the sensor, from which the dielectric constant of the fluid in which each sensing element is disposed can be determined. Methods of using such a sensor to determine the relative heights of various fluids in a fluid column are disclosed. In particular, methods of using embodiments of the invention in a well, such as water and petroleum wells, are described.

13 Claims, 10 Drawing Sheets

U.S. PATENT DOCUMENTS

| | | |
|---|---|---|
| 6,443,006 B1 | 9/2002 | Degrave |
| 6,502,634 B1 | 1/2003 | Evans et al. |
| 6,831,470 B2 | 12/2004 | Xie et al. |
| 6,844,743 B2 | 1/2005 | Lenormand et al. |
| 7,453,265 B2 * | 11/2008 | Johnstad et al. ............. 324/324 |
| 2006/0119363 A1 * | 6/2006 | Ligneul et al. ............. 324/337 |

OTHER PUBLICATIONS

PCT Written Opinion of the International Searching Authority, PCT/CA2008/000324, mailed Jul. 24, 2008.

Suzanne Griston and Dan Hutchinson, Field Testing of Dielectric Steam Quality Sensor, SPE International, May 1998, SPE 46236.

Alvaro Ribeiro, Developments in Multiphase Metering, Oct. 1996, SPE 36197.

* cited by examiner

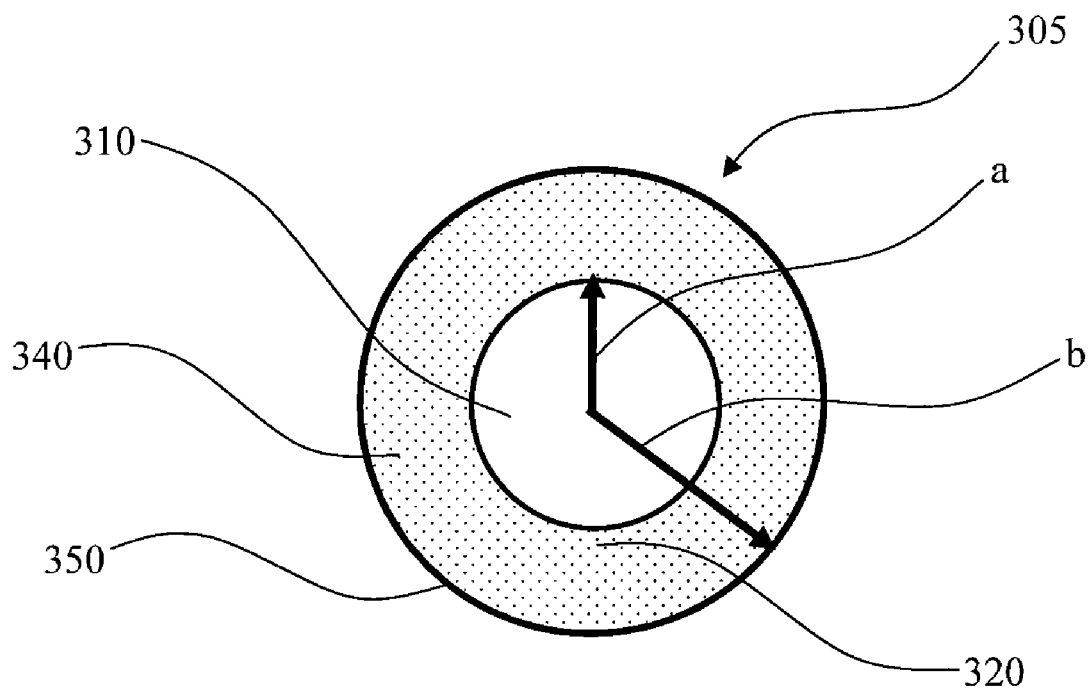
FIG. 3-A
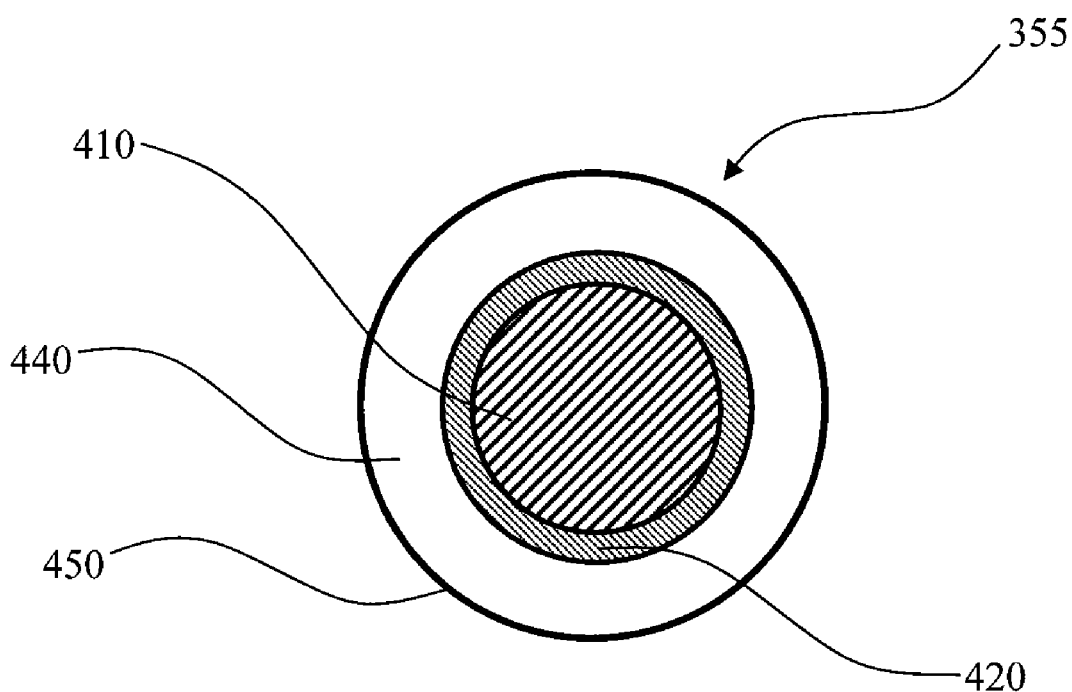
FIG. 3-B

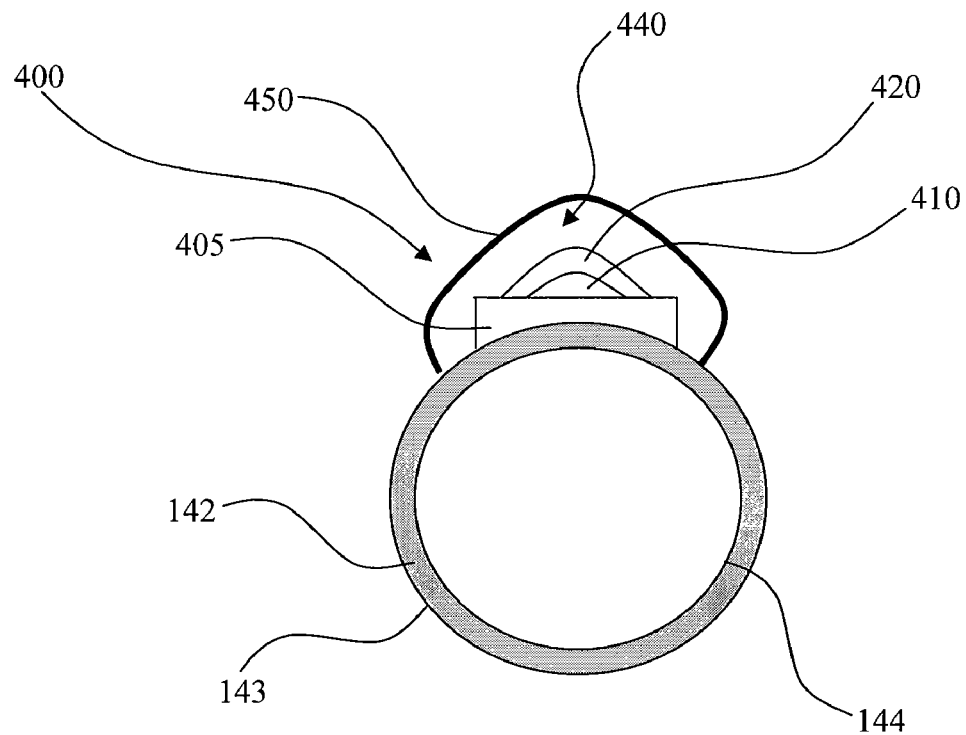
FIG. 4-A
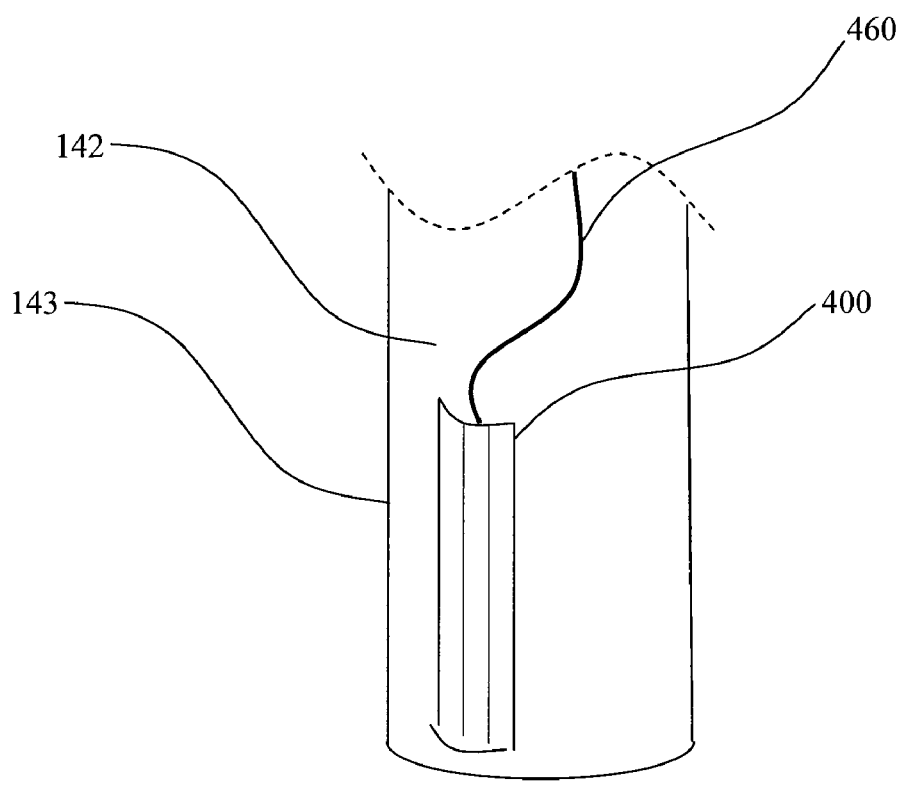
FIG. 4-B

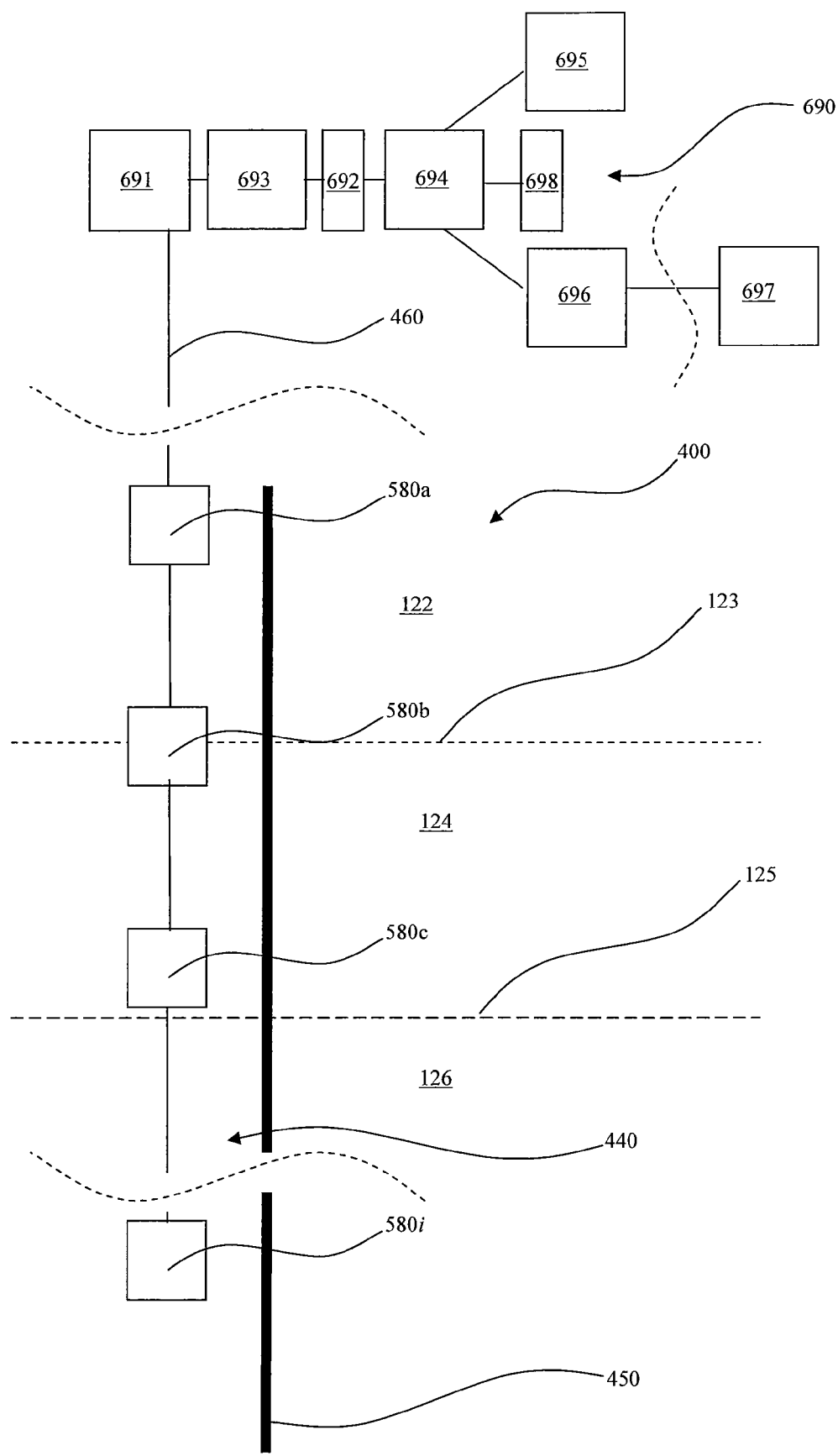
FIG. 6-A

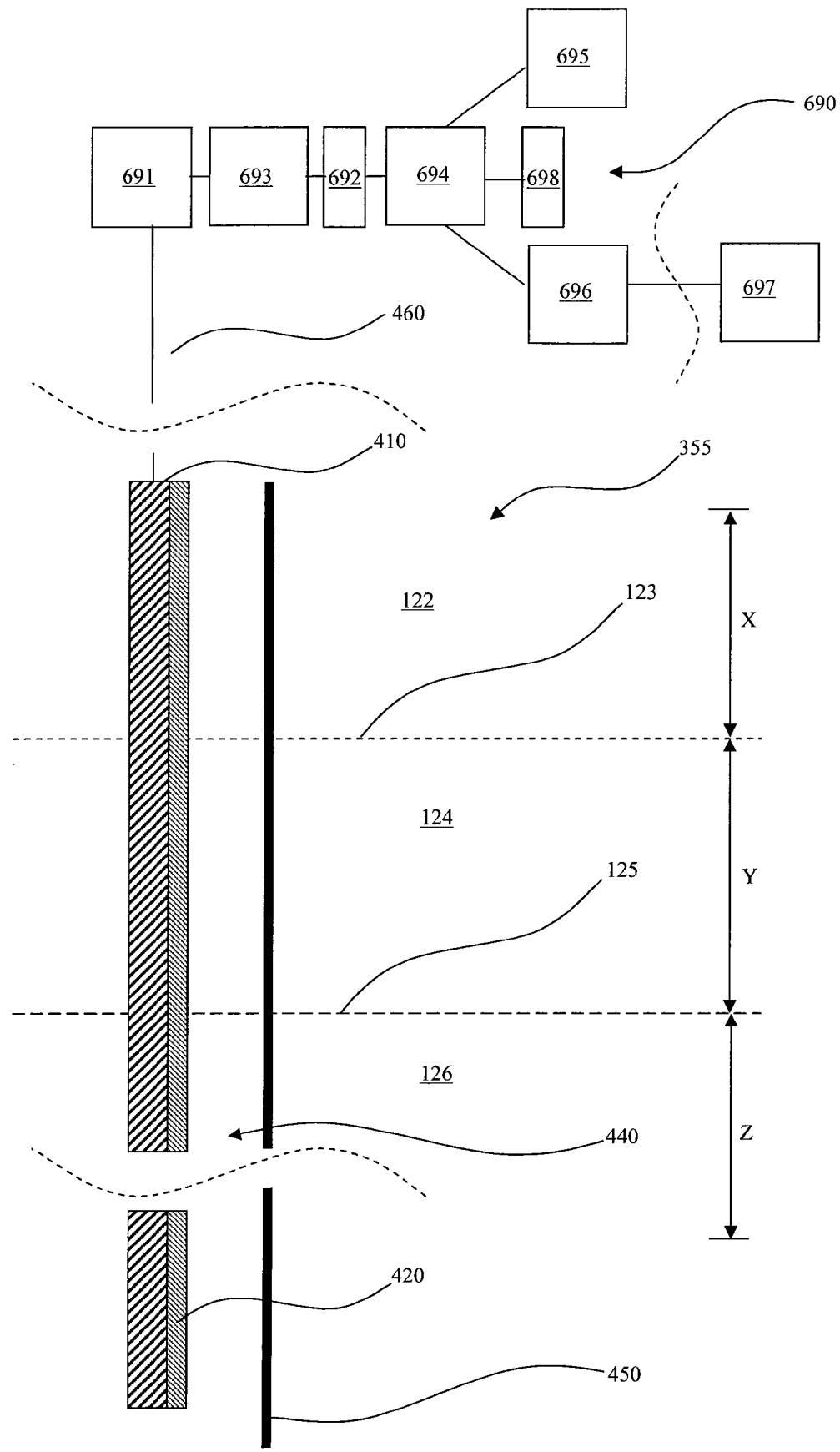
FIG. 6-B

FLUID LEVEL SENSING DEVICE AND METHODS OF USING SAME

PRIORITY CLAIM

This patent application claims priority from U.S. Provisional Patent Application No. 60/891,374 filed on Feb. 23, 2007.

BACKGROUND OF THE INVENTION

1. Field of the Invention

Embodiments of the invention relate to sensors that measure the capacitance of fluids into which the sensors are immersed, from which the type and the height or level of each of the fluids may be determined. Additionally, methods of using the invention to determine a location or boundary between different types of fluids are disclosed.

2. State of the Art

By way of background, wells, which may include oil, gas, water, or other fluids, are typically drilled through various formations of rocks having different material properties. One of these properties is porosity, which sometimes is defined as the ratio of the volume of empty space to the volume of solid matter in a formation of rock. For example, a sample of a formation of unit size has 0% porosity when the entire space is filled entirely with the solid rock. However, a formation having a porosity of 10% has 10% of the volume filled by a fluid.

In a typical formation having hydrocarbons dispersed in a porous rock, fluids having a low density relative to the other fluids present, such as natural gas, propane, and butane, would be near the "top" of the reservoir rock, or closer to the surface. The hydrocarbons, having a relatively greater density, are typically below the gases. At the lowest portion of the reservoir formation typically lies water because it is denser than the gases and the hydrocarbons.

FIGS. 1 and 2 illustrate a well bore 140 that traverses through several formation layers, 110, 120, and 130. For simplicity, the features of FIGS. 1 and 2 are depicted in two dimensions, however, it will be appreciated that in reality the formation layers 110, 120, 130, the well bore 140, and other features are three dimensional. Formation layer 110 is a "cap rock," such as shale, that acts as a seal that prevents the in situ formation fluids in the underlying formations from migrating upwards towards the surface. Formation layer 120 is porous rock and a "reservoir layer" in which formation fluids reside within the pore spaces of the formation layer 120. The formation fluids may include a gas layer 122, an oil layer 124, and a water layer 126. The relative volumes of layers 122, 124, and 126 may vary between wells and reservoirs, the important distinction being that in each case the fluids in layers 122, 124, and 126 segregate by density.

A boundary or interface exists at a location where fluids of differing densities meet. For example, the gas-oil interface location 123 demarcates the boundary or interface between the gas layer 122 and the oil layer 124. While the gas-oil interface location 123 appears in FIG. 1 as a straight line, in reality the boundary or interface extends through the formation and is typically non-linear, with variations based on geology, porosity, density, etc. It is merely for convenience and clarity that the gas-oil interface location 123 is depicted as a linear boundary in FIG. 1. Likewise, a boundary exists between the oil layer 124 and the water layer 126 at the oil-water contact location 125a, which demarcates the initial location of the oil-water interface before production of well fluids begins. As discussed more thoroughly below, the locations of the boundaries 123, 125a may change with time and is illustrated in FIG. 1 by the movement of the oil-water contact 125a to location 125b.

Often, it is desirable to know the location of an interface or boundary between two different fluids in a well, whether it is a water well, brine well (i.e., solution mining), methane/natural gas well, gas wells of other types, observation or injection wells, or petroleum wells. In each instance, but most particularly in the case of a petroleum well, multiple fluids may be present, both liquid and gaseous, and it may be of particular value to know the location of the boundary or interface between the fluids. This is so because it is usually desirable to produce, i.e., pump, to the surface only one or two of those fluids present in the well bore, especially in the case of a petroleum well. (Note: A petroleum well usually has water as well as gas and crude oil present, although the gas or the oil may not be present in commercially viable quantities, i.e., it is desirable to produce only one or the other.)

Unfortunately, water is often produced in a petroleum well. If the water cannot be reinjected in nearby well to improve oil production, it must be treated and disposed of in an environmentally sensitive manner, which may require the use of processes that are expensive. To reduce the amount of water produced and, therefore, reduce the cost of treating that water, it is desirable to know the location of the boundary between the water and the recoverable hydrocarbons present in the well.

The locations of the boundaries of the different fluids typically are determined, at least initially, through the use of logging tools, such as logging while drilling (LWD) tools that take measurements of various formation properties during the drilling of the well and wireline tools that make similar and additional measurements to LWD tools after the well is drilled. The measurements taken by these tools allow for the determination of the type of fluid present in the reservoir formation at a particular depth and, therefore, allow the determination of the location of the boundary between two types of fluids.

However, only that fluid that lies within the pore spaces of the reservoir rock near the well bore can be produced. The distance from the well bore that a fluid may be produced is a function, in part, of the permeability of the reservoir formation (i.e., the degree to which the pore spaces are connected and, thus, provide a path through which the fluid may flow to the well bore), the in-situ pore pressure (the pressure of the fluids in the pore spaces), the hydraulic pressure of the fluid column within the well bore proper, and several other factors known in the art. To form and flow channels to the well bore and, therefore, to increase the likely production of fluids from the pore spaces, the well may be perforated by, for example, the use of explosives. Perforating a well entails the placement of shaped explosive charges at desired locations selected, in part, on the measurement data from LWD and wireline tools and the identified boundary between the fluids. Other methods of increasing the channel to the well bore include hydraulic and acid-fracturing treatments. These treatments, while conceptually different from explosive perforation, use the same principles as explosive perforation to locate the optimum position for conducting the fracturing process. Therefore, for convenience, the discussion herein will refer to explosive perforation, but includes other fracturing processes known in the art.

Based on the initial location of the fluid boundary, a decision is made as to the best location to perforate or fracture the well. For example, the initial oil-water contact location 125a relative to the explosive perforation(s) 170 are indicated in FIG. 1. In most instances, the perforation(s) 170 are located within the oil layer 124 of the reservoir rock 120 if a petroleum well is at issue, although the perforations may be placed elsewhere as desired. Once the well has been perforated or fractured, the well is typically produced as either an open hole completion or with the use of production tubing 142, as known in the art.

A problem arises, however, in that reservoirs are dynamic systems and subject to various stimuli, few of which are in the control of the producer. As just one example, as a well produces fluid the location of the interfaces or boundaries of the fluids changes over time, as affected by various factors, such as the porosity and the permeability of the reservoir formation, the in-situ pore pressure, the rate at which the well is produced, and others.

As the locations of the boundaries change, the mix of produced fluids typically changes. An example of this is illustrated in FIG. 1, in which the initial oil-water contact location 125a moves upward to oil-water contact location 125b. As a result, the perforations 170 which were initially within the oil layer 124 may now lie, at least in part, within the water layer 126. The result is that more water and less oil may be produced in this well. This increases the cost of producing the well (e.g., increased costs to treat the excess water, reinject the water, etc.) just as the revenue generated (i.e., the amount of petroleum produced) decreases.

A phenomena related to the changing of the entire oil-water contact 125a is known as "water-coning." Water coning is the change in the oil-water or gas-oil contact locations, often as a result of producing fluids from the well too quickly by using excessive drawdown pressures. Water-coning occurs in vertical or slightly deviated wells, i.e., wells that have a low angle of inclination relative to vertical, and is affected by the characteristics of the fluids involved and the ratio of horizontal to vertical permeability. When the well is horizontal or highly deviated, the phenomenon is known as "cresting." Regardless of whether vertical or horizontal, the principles are the same. An example of water-coning is illustrated in FIG. 2. The initial water-oil contact location 125a changes from its initial configuration to a cone-shaped oil-water contact location 125b as the well is produced. As with FIG. 1, while the perforations 170 initially lie within the oil layer 124, once water-coning occurs the perforations 170 lie, in part, within the water layer 126.

The risk of water coning is partly diminished to some extent by carefully monitoring the locations of the fluid contacts and adjusting production rates accordingly in real-time. In addition, the accurate knowledge of the locations of the fluid contacts permits the design and execution of production treatments, such as additional perforation, fracturing, or the placement of packers to isolate non-productive zones, such as water producing zones in a petroleum well or saline zones in a fresh water well.

Unfortunately, the wireline or LWD tools that were used to make the initial measurements to identify fluid interfaces or boundaries in a well prior to production often cannot be used economically to make the same measurements while the well is producing. This is so because using wireline or LWD tools typically requires that the well to be shut-in (i.e., production stopped), resulting in a loss of revenue. Additionally, production tubing present in the well bore may have to be removed in order to run the wireline or LWD tools, leading to an even greater increase in cost and a longer time during which production and revenue is lost.

Considering the foregoing, it is therefore desirable to have a system that is capable of identifying and monitoring the location of an interface or boundary between different fluids in a producing well bore in real-time. In addition, it is desirable to have a system that minimizes or eliminates semiconductor and other electrical components in that portion of the system positioned in a well so as to reduce the risk of damage or failure resulting from exposure to temperature extremes, both high and low (in the case of nitrogen or carbon dioxide applications).

BRIEF SUMMARY OF THE INVENTION

Embodiments of the present invention include a sensor comprising a sensing element or a plurality of sensing elements that can be used to identify a location of an interface or boundary between fluids of different types present in a well bore. The sensing elements include an inner conductive element, a dielectric, and an outer conductive element. The dielectric and the outer conductive element are configured to form a volume which is occupied by at least one of the difference fluids present in the well bore when the sensing element is disposed in the well bore. Additionally, the sensor includes a frequency modulation device.

Embodiments of the present invention also includes methods of using a sensor to determine a location of an interface between two or more fluids in real-time while those fluids are being produced from a well bore. A plurality of sensors are positioned in a well bore and at least partially exposed to at least one fluid present in the well bore. In embodiments of the method, an electrical current of variable frequency is applied to the sensor. The capacitance of the sensor is measured and depends, in part, upon the fluid in which the sensor is disposed. Several physical characteristics of the fluid can be calculated, including the dielectric constant of the fluid. From the measured and calculated characteristics, the type of each of the different fluids is identified and a location of an interface or boundary between different fluids is determined.

Other features and advantages of the present invention will become apparent to those of ordinary skill in the art through consideration of the ensuing description, the accompanying drawings, and the appended claims.

BRIEF DESCRIPTION OF THE SEVERAL VIEWS OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 3-A is a coaxial capacitor;

FIG. 3-B is a cross-section of an embodiment of a sensing element;

FIG. 4-A is a top view of another embodiment of the sensor;

FIG. 4-B is a view of an embodiment of the sensor attached to production tubing;

FIG. 6-A is an idealized representation of the embodiment of the sensor depicted in FIG. 4-A;

FIG. 6-B is an idealized representation of the embodiment of the sensor depicted in FIG. 3-B;

DETAILED DESCRIPTION

Figure 1:
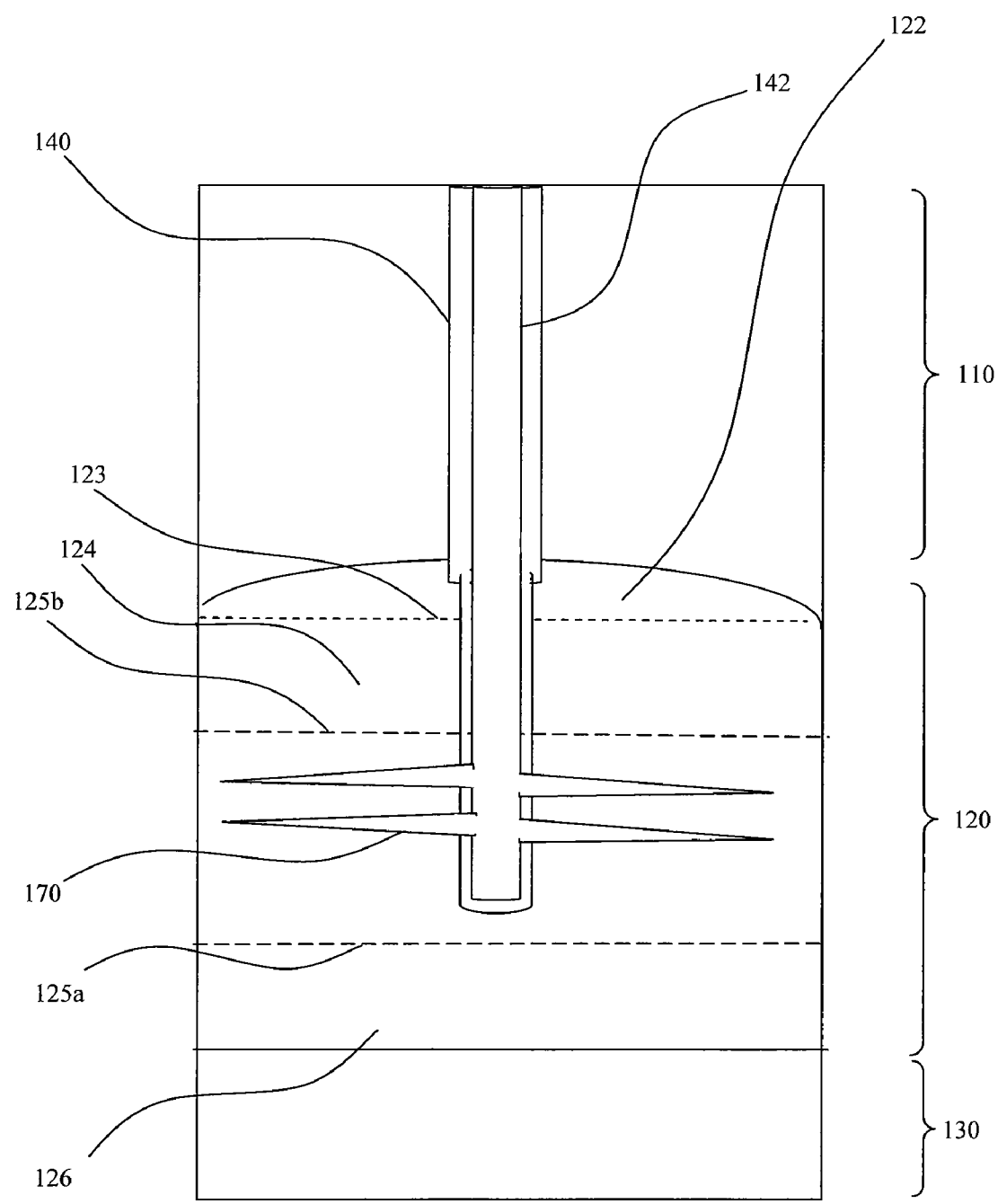
FIG. 1 is a well drilled through a formation and the location of various fluid boundaries within the formation.

Embodiments of the invention employ a sensor comprising one or more sensing elements to measure a capacitance and to calculate a dielectric constant of at least one fluid in which the sensor is at least partially disposed. If a plurality of fluids is present in a fluid column, the sensor measures the capacitance of each of the fluids as well as the combined total capacitance of the entire fluid column. A change in the total capacitance measured over a time interval indicates that a change in the total height of the fluid column or a change in the relative location of a boundary or an interface between two or more fluids present in the column has occurred. The change in the total measured capacitance occurs because the capacitance of each constituent fluid is a function, in part, of the dielectric constant of the fluid in which a sensor is immersed.

A cross-section of an embodiment of a sensing element 305 used in the invention is illustrated in FIG. 3-A. An electric current is carried through an inner conductive element 310 of radius a. The inner conductive element 310 is surrounded by a dielectric 320 that extends at least partially along the length of radius b. An outer conductive element 340 carries an electric current in a direction opposite to the direction of the electric current carried by the inner conductive element 310.

Presuming the length ($L_i$) of the cylindrical capacitor disposed in a fluid is long compared to radii a and b (e.g., the electric field is uniform between the inner conductive element 310 and the outer conductive element 320 and, therefore, the non-uniform electrical field at the end of the sensing element 305 has a relatively negligible impact on the measurement), the capacitance of a such a sensing element 305 may be represented by the equation:

$$C_i = G_i \in_0 \in_i L_i \quad (1)$$

in which i denotes the particular value for a given sensing element 305;

$C_i$ is the measured capacitance of the given sensing element 305;

$G_i$ is a geometric factor and is a function of the geometry of a given sensing element 305;

$\in_0$ is the permittivity of free space, a physical constant equal to $$\varepsilon_0 = 8.8542 \times 10^{-12} \frac{C^2}{Nm^2}, \quad (2)$$

in which "C" is the metric unit Coulomb and "$Nm^2$" is the metric unit Newton·meters$^2$;

$\in_i$ is the dielectric constant of a material disposed between the electrodes of a given sensing element 305, and;

$L_i$ is the length of the portion of a sensing element that is exposed to a fluid.

The geometric factor $G_i$ accounts for the spacing of the conductive elements 310, 340 and the cross-sectional profile of a given sensing element 305, among other factors, and can be calculated or empirically obtained for any selected capacitor. For example, the geometric factor of the cylindrical (coaxial) sensing element 305 depicted in FIG. 3 is, $$G_i = \left( \frac{2\pi}{\ln\frac{a}{b}} \right), \quad (3)$$

in which

π is approximately equal to 3.14597, and;

ln is the natural logarithm of the ratio of radius a of the inner conductive element 310 divided by the radius b of the outer conductive element 320.

While the geometric factor in this example is for a cylindrical sensing element 305, a sensing element of a different shape, such as oval, square, rectangular, or others, with a different geometric factor $G_i$ fall within embodiments of the invention.

The dielectric constant $\in_i$ is a physical property of a dielectric material 320 disposed between the conductive elements 310, 340 of the sensing element, and typically varies in a known matter with respect to temperature and pressure, as determined from empirical results and from reference to tables of chemical constants.

Figure 2:
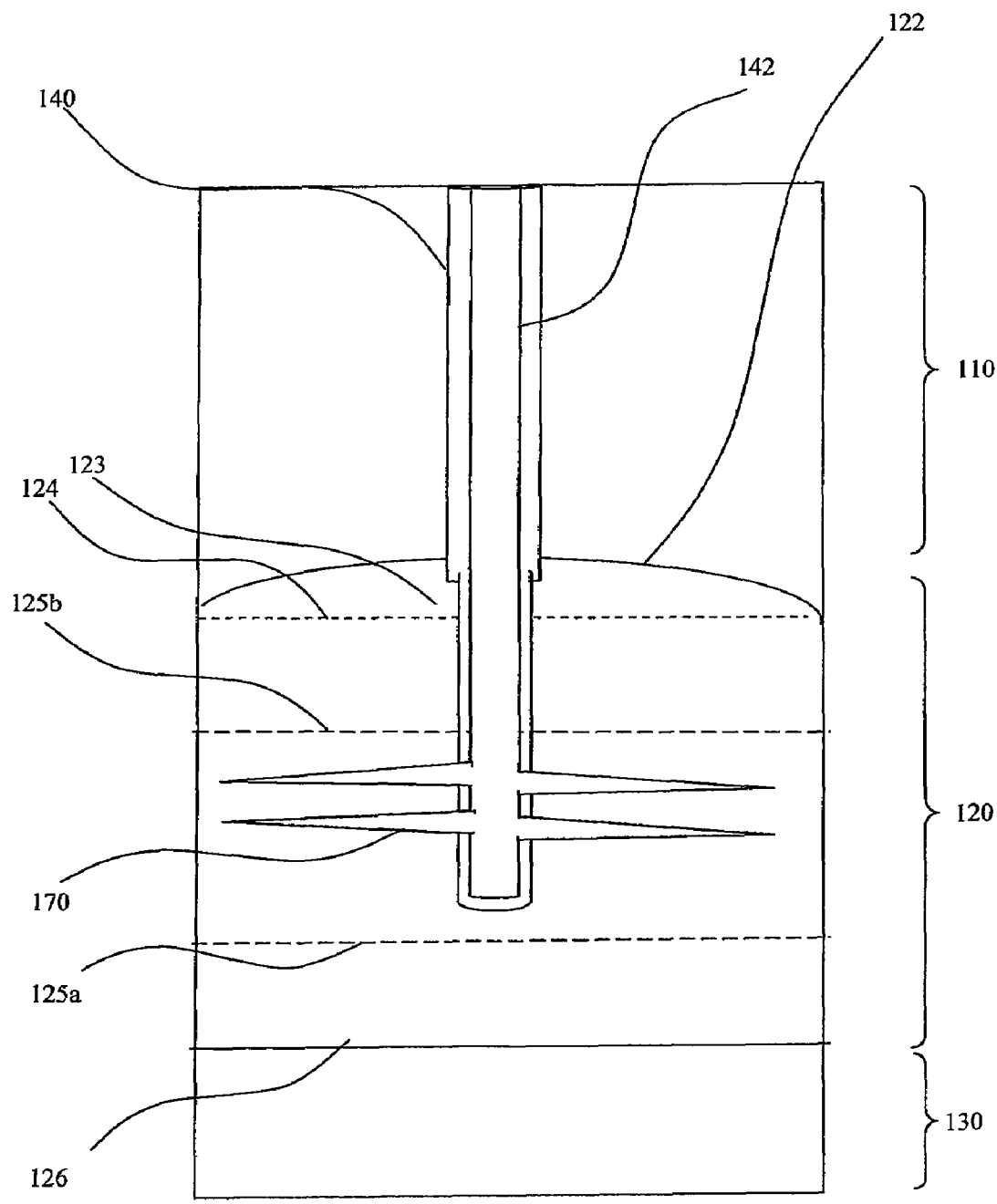
FIG. 2 is a well drilled through a formation and the location of various fluid boundaries within the formation and the phenomenon of water-coning.

An embodiment of the invention illustrated in FIGS. 4-A and 4-B includes a sensor 400 disposed upon production tubing 142, seen in FIGS. 1-2. Although sensor 400 is shown on an outer surface 143 of the production tubing 142, as best seen in FIG. 4-B, the sensor 400 is optionally disposed upon the inner surface 144 of the production tubing 142 (not shown). Alternately, the sensor 400 is disposed upon an inner annular surface of a casing or liner string 140 in FIGS. 1-2 (not shown) or conveyed into a well bore by other means known in the art, such as by wireline, slickline, coiled tubing, etc, for non-permanent applications. The sensor is attached to the production tubing by an adhesive, straps, cable ties, or other methods known in the art.

The sensor 400 includes a sensing element comprising an electrical insulator 405 that electrically isolates an inner conductive element 410 from either an outer surface 143 or an inner surface 144 of the production tubing 142. A material 420 that is a dielectric, or displays dielectric like properties at the conditions encountered in the well, is fixed to and at least partially covers the inner conductive element 410. An outer conductive element, or guard electrode, 450 is disposed laterally from the inner conductive element 410. The volume 440 is defined in part by the guard electrode 450, the dielectric material 420, and the electrical insulator 405. Openings at the end of the sensor 400 or openings in the guard electrode 450 (e.g., perforations or holes through the guard electrode 450) provide a means for fluids present in the well bore to communicate with, enter, and occupy the volume 440. A control line 460, typically an electrical conductor, seen in FIG. 4-B, provides a means to receive electrical power and transmit and to receive communications (e.g., analog and digital data) between the sensor 400 and surface systems 690 located at the surface, as described in further detail below vis-à-vis FIGS. 6-A and 6-B.

The dielectric material 420 is selected for desirable properties related to a physical environment in which it is to be used. Among other properties, the dielectric constant of the dielectric material 420 changes predictably and, preferably, remains substantially constant over a range temperatures and pressures to which the dielectric material 420 is exposed, as well as a range of frequencies of electric current that are applied to the sensor 400. Of course, one will understand that the physical environment includes other factors, such as pH (acidity), erosion, salinity, and other factors which may be considered in selecting the dielectric material 420. Other properties for which the dielectric material 420 is selected include the accuracy (e.g., the degree to which the measured value conforms to a true value) and the reproducibility (e.g., the degree to which subsequent measured values conform or are similar to earlier measurements) with which the sensor 400 measures a value.

Additionally, the dielectric material 420 of the sensor 400 is selected, in part, to exhibit a dielectric constant that is predictable and substantially constant over a selected range of temperatures because, as a depth of well bore increases, the temperature in the well bore typically increases at a rate of approximately 1° F./100 ft. While the temperature gradient and temperature maximum typically varies globally or even across a geographic region, it is desirable that a sensor and, more specifically, a dielectric material 420, retains at least a predictable change in measurement accuracy, reproducibility, and dielectric constant with temperature so that the measured values made by the sensor 400 can be compensated through algorithms, empirical data, and other means to account for the affect of these factors on the measurement. Additionally, embodiments of sensors described herein are usable in injection wells, such as high temperature steam injection wells. Such injection wells typically have temperatures much higher than those encountered in a production well. Preferably, the sensor 400 and the dielectric material 420 retain a substantially constant accuracy over a range of temperature. Examples of such temperature ranges encountered in a petroleum wells, injection wells, and the like, range from negative 100° F. to 600° F. As an example, the configuration of a sensor 400, such as the material and/or the configuration of its dielectric material 420, exhibits a substantially predictable and substantially constant measurement accuracy, reproducibility, and dielectric constant over a smaller, selected temperature range, such as 300° F. to 600° F., 100° F. to 450° F., and so forth. In applications in which nitrogen or carbon dioxide is being injected into the well, the sensor 400 and the dielectric material 420 should retain a substantially constant accuracy at much lower temperatures, including temperatures below the freezing point of water and as low as negative 100° F. As will be understood, these smaller, selected temperature ranges are examples only, and other selected ranges fall within the scope of the disclosure and the claims.

Furthermore, the dielectric material 420 of the sensor 400 is selected, in part, to exhibit a dielectric constant that is predictable and substantially constant over a selected range of hydrostatic pressures to which the sensor 400 is exposed. This is because the capacitance of a capacitor typically changes as the dielectric material is squeezed or exposed to increasing pressures, requiring a correction factor to be applied to the measurement. By using a dielectric material 420 that maintains a substantially constant dielectric constant over a pressure range, the need to use and the magnitude of the correction factor and, therefore, the potential for error, is reduced. The hydrostatic pressure to which a dielectric material 420 is exposed ranges from atmospheric pressure (14.7 pounds per square inch (psi), on average) to pressures of 30,000 psi in the case of high pressure injection wells. As an example, the configuration of a sensor 400, such as the material and/or the configuration of its dielectric material 420, exhibits a substantially predictable and substantially constant measurement accuracy, reproducibility, and dielectric constant over a smaller, selected pressure range, such as: 1,000 psi to 7,000 psi; 2,500 psi to 10,000 psi; 10,000 psi to 15,000 psi, 15,000 to 20,000 psi, and so forth. As will be understood, these smaller, selected pressure ranges are examples only, and other selected ranges fall within the scope of the disclosure and the claims.

Additionally, a dielectric material 420 for use in a sensor 400 should exhibit at least partial and, preferably, substantial resistance to degradation and decomposition when exposed to a variety of fluids present in a well bore. Examples of such fluids include in-situ fluids, including gases (e.g., methane, propane, butane, hydrogen sulfide, carbon dioxide, helium, carbon monoxide, nitrogen, etc.), liquids (e.g., octane, nonane, and longer chained hydrocarbons), and water, which may have a substantially salt and mineral content. Other fluids include those that are added to the well bore as part of the process of producing the well, including completion fluids, well bore treatments, hydraulic fracturing fluids, acids, inhibitors, and secondary recovery fluids, such as water, natural gas, steam, and carbon dioxide, and the like. Further, the dielectric material 420 should exhibit substantial resistance to degradation when exposed to any solid particles present in any of the aforementioned fluids, including sands, salt, minerals, barite, proppants (e.g., silicates, glass, etc.), and the like. Substantial resistance in each example includes exhibiting a substantially constant dielectric constant as well as exhibiting a substantial resistance to erosion and wear while exposed to these fluids.

An example of a sensor 400 that functions in such environments as those described above include those having a dielectric material 420 made from ceramic, PTFE (Teflon™ or nylon), polypropylene, glass, polycarbonate, and others known in the art. For example, ceramic dielectrics of the C0G or NP0 type are useful because they typically exhibit very low dielectric losses and have a dielectric constant that remains substantially constant over a wide range of temperatures. Of course, as noted above, the specific dielectric used is selected for the expected well conditions and intended use and, therefore, may be of a different, suitable material known in the art.

Referring again to FIG. 4, the outer conductive element, or guard electrode, 450 further protects the dielectric material 420 and the inner conductive element 410 from excessive erosion from fluids flowing in the well bore and from damage that otherwise might be incurred during installation or removal of the sensor 400 in the well bore. The guard electrode 450 is formed from a metal or other conductor and has a geometry selected to mitigate non-uniform electric field effects that otherwise typically occurs around the inner conductive element 410 as an electrical current passes through the inner conductive element 410. The guard electrode 450 includes holes, perforations, or other similar means (not shown) through which fluids present in a well bore communicate with and occupy the volume 440. Optionally, the guard electrode 450 is open on the top of the sensor 400, bottom, or both, providing another path for the fluids to communicate with and occupy the volume 440.

As will be discussed in greater detail below, the fluid present in the volume 440 acts as a dielectric material (in addition to the dielectric material 420) if the fluid is electrically non-conductive. Thus, the volume 440 is configured so that the dielectric effect of the fluid on the capacitance measured by the sensor 400 is optimized. In other words, the size and shape of the outer conductive element 450 is configured so that the dielectric effect of the fluid has an impact on the capacitance measured by the sensor 400 relatively greater than that of the dielectric material 420. Such an arrangement makes it easier to distinguish the type of fluid filling the volume 440.

The electrical conductor, or control line, 460 provides a means for communicating with the sensor 400, including a means for transmitting electrical power as well as data (digital and analog). The control line 460 includes an electrical connection to the sensor 400 that is configured to supply power with a separate connection to the sensor 400 configured to transmit data. For example, one connection to the sensor 40 provides electrical power from a power source and a frequency modulator device while another connection provides communication with a computer and data storage device. Optionally, the electrical conductor, or control line, 460 combines the power connection and the data connection into a single line. In an alternate configuration, each sensor 400 uses its own dedicated control line 460.

Figure 5:
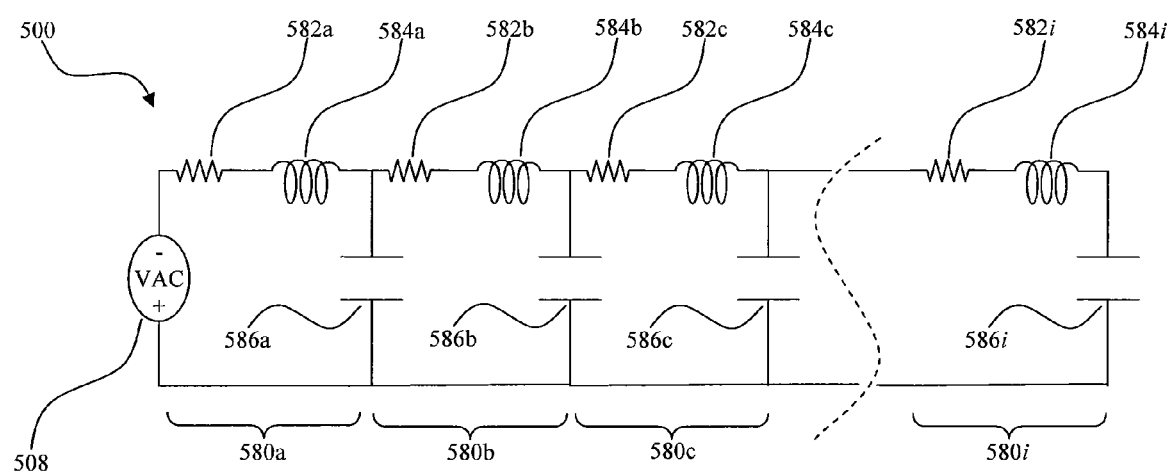
FIG. 5 is an equivalent wiring diagram of embodiments of the sensor.

An equivalent wiring diagram of an embodiment of a sensor 400 used in the process is illustrated in FIG. 5. A power supply 508 supplies an electrical current at a selected voltage to the sensor 400. The power supply 508 is coupled electrically to a frequency modulator, such as an oscillator (not shown) that is capable of altering the frequency of the current supplied to the sensor 400 by the power supply 508. Alternatively, instead of an analog oscillator, a digital frequency modulator may be used. In addition, the amplitude of the voltage provided by the power supply 508 can include a device to modulate the amplitude either digitally or through analog methods known in the art. The sensor 400 includes a plurality of sensing elements 580*a*, 580*b*, 580*c*, through 580*i*, in which the number i of sensing elements is limited in part by the voltage supplied by the power supply 508 and the voltage drop across each sensing elements 580*a*, 580*b*, 580*c*, through 580*i*. Each sensing element 580*a* through 580*i* includes a resistor 582*a*, 582*b*, 582*c*, 582*i*, an inductor 584*a*, 584*b*, 584*c*, 584*i*, and a capacitor 586*a*, 586*b*, 586*c*, 586*i* connected electrically in parallel with its respective resistor 582*a* through 582*i* and inductor 584*a* through 584*i*. While FIG. 5 illustrates an equivalent diagram, the actually sensor 400 optionally includes all of these elements, i.e., a resistor, a conductor, and an inductor.

The capacitor 586*a* through 586*i* includes the electrical insulator 405, inner electrode 410, dielectric material 420, and outer electrode 450 as set forth in greater detail vis-à-vis FIGS. 4-A and 4-B above.

The plurality of sensing elements 580*a* through 580*i* form a network of band stop filters, or "notch filters," with each sensing element 580*a* through 580*i* acting as an individual band stop or notch filter. A band stop filter allows most frequencies to pass unaltered but attenuates those frequencies within a given frequency range of the band or "notch" of the filter to a relatively low level. The number of band stops within a sensor 400 is equal to the number of sensing elements 580*a* through 580*i*. Optionally, an electronic monitoring device (not shown), such as an impedance bridge, is connected to the sensor 400.

An idealized sensor 400, comprising each of the sensing elements 580*a*, 580*b*, 580*c*, through 580*i* is illustrated in FIG. 6-A. Each of the sensing elements 580*a* through 580*i* includes a capacitor, a resistor, and an inductor, as described above and in FIG. 5. A guard electrode 450 at least partially covers and provides at least partial protection to the sensor 400. The electrode 450, as shown more fully in FIGS. 4-A and 4-B, defines, in part, a volume 440 that is occupied by a fluid or a plurality of fluids that are present in the well bore. An electrical conductor, or control line, 460 electrically couples the sensor 400 to the surface systems 690, which includes a frequency modulator 691, such as an oscillator, a digital frequency modulator, a voltage amplitude modulator, and other systems located at the surface of the well bore. The frequency modulator 691 electrically communicates and modulates the frequency of the electrical current supplied by the power supply 692. Optionally, the frequency modulator 691 and the power supply 693 may be integrated into a single unit. The power supply 693 supplies an alternating current to the sensor 400, in which the amplitude of the voltage may be modulated manually or automatically by analog and/or digital methods known in the art.

The sensor 400, frequency modulator 691, and power supply 693 are electrically coupled to an analog-to-digital converter 692 capable of converting analog signals, or data, that are representative of an electrical characteristic of the fluid in which the sensor 400 is disposed to a digital signal capable of being processed by a processor 694. The analog-to-digital converter 692 can stand alone or be integrated with the processor 694. The processor 694 sends commands to each of the sensor 400, the frequency modulator 691, and the power supply 693 in accordance with a program stored within a memory storage device 695. The program is a software program that automates the measurement process and can use the signals or data representative of an electrical characteristic of a fluid to determine and generate a signal, or data, representative of the location of an interface or boundary between fluids. In addition, the processor may determine and generate data, or signals, representative of the electrical and physical characteristics of the fluid, including the dielectric constant of the fluid, the identity (or type) of fluid present, the phase shift or frequency shift in the electrical current transmitted from the sensor and other data. For example, a specified measurement program for the processor 694 instructs the sensor 400 to run, e.g., commanding the sensor 600 to take measurements at specified time and/or depth intervals.

The processor 694 is coupled to a memory storage device 695 that is configured to store an operating program and instructions as well as data (digital and analog signals, that include data transmitted therein, converted to digital data by the analog-to-digital converter 692) as measured by the sensor 400. The signals or data stored includes any combination of time, depth, frequency spectrums, operating conditions, and other parameters of interest. Embodiments of the memory storage device 695 include flash memory, externally erasable programmable Read-Only-Memory (EEPROM), nonvolatile memory, removable memory cards or memory sticks, hard drives, and the like.

Optionally, the processor 694 is also coupled with a communication device 696 that is configured to transmit data stored in the memory storage device 695 to a remote computer or server 697, for example, or a monitor, printer, or other output device. Examples of the communication device 696 include a wireless networking card, Ethernet connection, satellite connection, cable modem, and other similar connections. In addition to sending data, the communication device 696 is configured to receive instructions, software upgrades, and other information to be sent to the processor 694 from a remote server or computer 697.

The output device is positioned and configured to provide information and data so that a user can perceive the information, typically visually on either a monitor or printer. The output device is configured to receive the digital data from the processor 694, memory storage device 695, the communication device 696, including information and data such as the location of an interface between two fluids, the phase shift in the current applied to the sensor, as described in more detail below, the dielectric coefficient of the fluids, and other information.

The sensor 400 and the surface systems 690 are installed at a well site, with the sensor 400 disposed in a well bore. For example, the sensor 400 is disposed in a well bore that has a gas-oil contact location 123 and an oil-water contact location 125a that defines the location of an interface or boundary between each of the fluids present. Of course, the sensor can be used in well bores of differing types, as discussed above.

Another embodiment of the invention includes a sensor 355, as seen in cross-section in FIG. 3-B. The sensor 355 includes an inner conductive element, or electrode, 410 that is surrounded by a dielectric material 420. An outer conductive element, or ground electrode, 450 spaced radially apart from the dielectric 420 and the inner conductive element 410, the ground electrode 450 and the dielectric 420 defining a volume 440 that includes a means through which fluids present in a well bore can communicate into the volume 440, such as perforations in the ground electrode 450 as described in greater detail above. As with the sensor 400 described above, the sensor 355 is connected to the surface systems 690 through the use of an electrical conductor, or control line 460, as seen in FIG. 4-B.

The sensor 355 is disposed in a well bore as described with respect to sensor 400 above and illustrated in FIG. 4-B. However, whereas sensor 400 comprises a plurality of discrete sensing elements 580a to 580i as illustrated in FIGS. 5 and 6-A and discussed above, the sensor 355 is a single sensing element that is described by an equivalent circuit 500, illustrated in FIG. 5, when the sensor 355 is disposed in a plurality of fluids. In other words, while sensor 355 does not include a plurality of sensing elements 580a to 580i, its behavior is equivalent to the sensor 400 as depicted in the circuit diagram 500.

In practice, and with reference to FIG. 6-B, the result that the single sensing element of sensor 355 acts as the equivalent circuit 500 occurs because the sensor 355 is disposed in a well bore and exposed to the fluids present in the well bore. For example, in the gas layer 120, the natural gas present permeates and fills the volume 440 along a length X of the sensor 355 that is disposed in the gas layer 120. As a consequence and as described in the examples below in greater detail, the length X of sensor 355 behaves substantially equivalent to the discrete sensing element 580a illustrated in FIGS. 5 and 6-A. Similarly, the length Y of sensor 355 is disposed in the oil layer 124 of the reservoir. The oil that fills the volume 440 acts as a dielectric, and thus the sensor 355 along length Y acts substantially equivalent to the discrete sensor 580c. Likewise with the length Z of the sensor 355 disposed in the water layer 126 of the reservoir formation, which acts substantially equivalent to the discrete sensor 580i. In each instance, an equivalent circuit for that portion of the sensor 355 disposed in a given fluid, can be determined.

In a method of the invention, the frequency modulator 691 alters the frequency of the current supplied by the power supply 692. The frequency applied is selected from a desired frequency range, which may be in any range from the kilohertz range up through the gigahertz range. For example, an embodiment includes a software program that instructs the processor 694 to command the frequency modulator 691 to change the frequency of the current supplied to the sensor 400 in accordance with the program, such as a discrete stepchange in the frequency, a short pulse or burst over a range of frequencies, or a continuous sweep of frequencies up and down a selected range of frequencies. By altering the frequency of the current applied to the sensor 400 it is possible to distinguish the location of a boundary or interface between two or more different fluids as will be explained more below in further detail below. At very high frequencies, such as those in the radio frequency range, some metals begin to act as a dielectric. Thus, the probability of this effect occurring in the guard electrode 450 is a factor to be considered in selecting the range of frequencies to be applied by the frequency modulator 691 as well in selecting the type of metal to be used in the guard electrode 650, e.g., selecting a metal that is less likely to behave as a dielectric at high frequencies.

For each filter 580a to 580i, as seen in FIG. 5 and the corresponding equivalent circuits that result from the sensor 355 described in FIG. 6-B, the frequency permitted to pass through each filter, the bandwidth of the filter, and the efficiency of the filter are each a function, in part, of the capacitance measured by the sensing element 580a to 580i, the size in henrys of each inductor 584a to 584i, the size in ohms of each resistor 582a to 582i, and the order in which the fluids occur along the length of the strip. The magnitude and the frequency spectrum of the voltage signal returned from the sensor 400 and, more particularly, the center frequency of each band stop filter, allows for the determination of the location of the interface between fluids of different types, as will be illustrated in more detail in the examples below.

Additionally, as discussed above, the behavior of the dielectric 420 is dependent upon the physical environment, including the temperature and the pressure, to which the dielectric 420 is exposed in the well bore. By knowing the manner in which the dielectric material 420 responds to the physical environment, including the pressure and temperature, such as the effect a given change in temperature or a given change in pressure has on the capacitance as measured by the sensor, the temperature and pressure in the well bore at a given sensing element is calculated. The processor 694 can analyze the data and run the data through an algorithm, with the temperature and pressure data being stored in the memory storage device 695 and sent via the communications means 696 to a remote server location 697.

Optionally, the measurement program analyzes the data measured by the sensor 400 that is transmitted to the surface in real-time or near real-time to make adjustments to optimize the production of the well. In such an instance, the processor 694 is configured to communicate with a smart completion system to adjust drawn-down pressures to optimize production. For example, the measurement program takes measurements from the sensor 400 at a first time with the processor 694 storing that data in the memory storage device 695. The measurement program takes subsequent measurements from the sensor 400 at a second time interval, which typically is between one-quarter to one hour later, although other time intervals are within the scope of the invention. The program compares the measurements taken at the two times and observes whether the location of the oil-water contact location 125a changing in such a way that more water is likely to be produced. As a result, the processor 694 communicates with a pumping system, such as a smart completion system, 698 used to pump fluid from the well, and commands the pumping system 698 to slow the rate at which it is pumping fluids, reduce the drawdown pressure, and other parameters, thereby reducing the likelihood of water production. Additionally, the commands that the processor 694 sends to the sensor 400 and any smart completion system 698 as well as any data gathered by the processor 694 is transmitted via the communication device 696 to an offsite location, such as a remoter server or computer, 697 to inform a user of the status of the system and the well. Optionally, the processor 694 receives commands, software updates, etc., from the remote server 697 that override or supplements the measurement program stored in the memory storage device 695. Besides the rate at which a pumping unit produces a well, other parameters that the processor 694 can adjust include parameters associated with completion fluid or fluids that are used in the well, such as the type of completion fluid, its density, and other parameters known in the art. Furthermore, the data measured from the sensors in accordance with the measurement program is usable for designing and optimizing well interventions, which are treatments designed to improve well production. Optimizing production of a well includes maximizing the flow rate of fluids produced for short term value, maximizing the total amount of recoverable hydrocarbons over the life of the well, return on investment, minimizing formation damage, a combination of these considerations, and others known in the art.

EXAMPLE 1

For example, a sensor 355, 400 comprising a single sensing element as described above is at least partially disposed in a fluid such as saline water or brine; the water occupies the volume 440 in the sensor as shown in FIGS. 3-B and 4-A and as described above. The measured capacitance is calculated from the equation below.

$$C_{water} = G_{ins} \epsilon_0 \epsilon_{ins} L_{water} \tag{4}$$

In this equation, $C_{water}$ is the capacitance as measured by the sensor 400 disposed in the brine.

$G_{ins}$ is the geometric factor of the sensor 355, 400 and is a function of the sensor geometry and is dependent, in part, upon the thickness of the dielectric 420.

$L_{water}$ is the length of the capacitor exposed to the water.

$\epsilon_0$, as mentioned, is the permittivity of free space.

$\epsilon_{ins}$ is the dielectric strength of the dielectric 420. Typically, the dielectric constant of the fluid that occupies the space 440 is used. However, in this instance the fluid that occupies the volume 440 is brine; because brine is a conductive medium it does not act as a dielectric. Therefore, the dielectric constant of the dielectric 420 is used in lieu of the dielectric constant of the brine. More typically, in the situation in which non-conductive well fluids occupy the volume 440, the dielectric constant of the dielectric 420 is otherwise ignored because the contribution of the dielectric 420 to the capacitance as measured by the sensor 355, 400 is small relative to the contribution of the dielectric of the non-conductive well fluids. The fact that the conductance as measured by sensor 355, 400 changes depending on the fluid into which it is disposed allows for the determination of a location of a boundary between types of fluids as described in the next example.

EXAMPLE 2

In this example, the location of a boundary between a first fluid, brine, and a second fluid, natural gas (methane) is determined with a sensor 355, 400 having a plurality of sensing elements 580a to 580b, respectively (equivalent sensing elements with respect to sensor 355).

Both sensing elements 580a and 580b are calibrated using the sensing elements 580a and 580b to measure the capacitance of actual fluid samples taken from a well bore that already have had their capacitance measured in a laboratory. For example, wireline tools typically take fluid samples prior to the well being completed. Such fluid samples have their respective dielectric constants measured at well bore pressures and temperatures and that information is used to help calibrate the sensor 355, 400, which allows for a more accurate measurement of the capacitance to be made by the sensor 355, 400 when in use.

The measured capacitance of a plurality of sensing elements in parallel (or their equivalent circuits for sensor 355) is represented by the following equation.

$$C_{measured} = \sum_i C_i \tag{5}$$

where $C_i$ is defined above. Thus, the total capacitance as measured by two sensing elements, one (580a) disposed within the gas and the other (580b) within the water is:

$$C_{measured} = C_{gas} + C_{water}. \tag{6}$$

The capacitances measured by a single sensing element 580a fully disposed in natural gas another sensing element 580b fully disposed in water are given below in equations (5) and (6), respectively.

$$C_{totg} = G_{ins} \epsilon_0 \epsilon_{gas} L_{totg} \tag{7}$$

$$C_{totW} = G \epsilon_0 \epsilon_{ins} L_{totW}. \tag{8}$$

As mentioned above, the geometric factor for the sensor is known, as the sensor is selected before hand, as noted in the discussion of equation (1). Further, the dielectric constant of the dielectric 420 is known, also as noted in the discussion of equation (1). Finally, the length of the sensor, known from the pre-selected geometry, is also known. Thus, for a sensing element disposed fully in brine, the capacitance measured by the sensing element disposed fully in the water, $C_{totW}$ is known, as described with respect to equation (4).

Likewise, $C_{totg}$ is known for the same reasons, given the same geometric factors, when an electrical current is applied to the sensor 355, 400. Additionally, the dielectric constant of the fluid, natural gas in this instance, that occupies the space 440 in FIGS. 3-B and 4-A is known either from empirical tests conducted on actual samples of fluids from the well at standard pressure-volume-temperature (PVT) or in situ (i.e., in the well) PVT, from numerical modeling, and from data tables of physical constants.

In this example, the total combined level of the brine and natural gas is known, but the location or level of the individual constituents and, hence, the location of the interface or boundary between the two fluids, is unknown. Written in equation form, the total combined level of the brine and the natural gas is:

$$L_{tot} = L_{gas} + L_{water}, \tag{9}$$

in which $L_{water}$ is the length or height of the water column and $L_{gas}$ is the length or height of the natural gas column. Equation (9) may be rearranged as such:

$$L_{gas} = L_{tot} - L_{water}. \tag{10}$$

Substituting the individual equations of the measured capacitance of a sensor disposed within the water and the gas, equation (7) and (8), respectively, into equation (10) gives the formula:

$$C_{measured} = G \epsilon_0 \epsilon_{gas} L_{gas} + \epsilon_{ins} \epsilon_0 \epsilon_{ins} L_{water}. \tag{11}$$

Equation (10) may be substituted into equation (11) to provide:

$$C_{measured} = G \epsilon_0 \epsilon_{gas} (L_{tot} - L_{water}) + G_{ins} \epsilon_0 \epsilon_{ins} L_{water}. \tag{12}$$

Multiplying through equation (12) provides the following:

$$C_{measured}=(G\varepsilon_0\varepsilon_{gas}L_{tot}-G\varepsilon_0\varepsilon_{gas}L_{water})+ G_{ins}\varepsilon_0\varepsilon_{ins}L_{water}. \quad (13)$$

Rearranging equation (13) provides the following:

$$C_{measured}-G\varepsilon_0\varepsilon_{gas}L_{tot}=L_{water}\varepsilon_0(G_{ins}\varepsilon_{ins}-G\varepsilon_{gas}). \quad (14)$$

Note, however, that the value of $C_{totg}$ is given above in equation (8) for the situation in which a sensor is disposed fully within the gas. As such, equation (8) is substituted into equation (14) to provide:

$$C_{measured}-C_{totg}=L_{water}\varepsilon_0(G_{ins}\varepsilon_{ins}-G\varepsilon_{gas}). \quad (15)$$

Equation (15) is rearranged to solve for $L_{water}$, thus providing the height of the water column.

$$L_{water}=\frac{(C_{measured}-C_{totg})}{\varepsilon_0(G_{ins}\varepsilon_{ins}-G\varepsilon_{gas})}. \quad (16)$$

Once the level of the water is known, that value is substituted back into equation (10) and the level for the gas is solved and, consequently, the location of the interface or boundary between the water and the gas is determined.

EXAMPLE 3

In some situations, three or more fluids are present in a well bore. In such cases, the previously described approach is inadequate to determine the interface between each of the fluids because three unknowns exist while only two equations exist to solve for the unknowns.

To identify a location of three or more interfaces between fluids of different types, a frequency modulator is used to apply an alternating electrical current at a first frequency to a sensor 355, 400 as seen in FIGS. 6-A and 6-B and discussed above.

The capacitance and the dielectric constant of each of the different fluids is measured at the first frequency by the sensing element or elements disposed in the fluids, using the process described above in Example 1 and in equations (5-16). Once the capacitance of a sensing element disposed in each of the fluids is measured at the first frequency, the frequency modulator applies an electrical current at a second frequency and the capacitance of the sensing element disposed in each of the fluids is measured again. In the example and the equations that follow, three fluids are present, saline water, gas, and oil, respectively, and are represented by a modification of equation (9).

$$L_{tot}=L_{water}+L_{gas}+L_{oil}. \quad (17)$$

Presuming that the total level, $L_{tot}$, of the combined fluid column is known, equation (17) has three unknowns, $L_{water}$, $L_{gas}$, and $L_{oil}$. To solve for each of the unknowns, the method may begin with equation (11), which is modified to include a capacitance measured by a sensing element at least partially disposed within oil.

$$C_{f1}=G_{ins}\varepsilon_0\varepsilon_{ins}L_{water}+G\varepsilon_0\varepsilon_{gas}L_{gas}+G\varepsilon_0\varepsilon_{oilf1}L_{oil}. \quad (18)$$

The subscript f1 denotes that the measurement is taken with an electrical current at a first frequency applied by the frequency modulator. The term $\varepsilon_{oilf1}$ accounts for the observation that the dielectric constant of the oil typically varies with the frequency of the electrical current applied to the sensing element by the frequency modulator. The dielectric constant for the sensing element disposed at least partially in the water typically remains $\varepsilon_{ins}$ because, as noted above in the discussion of equation (4), the saline water is a conductive medium.

For the capacitance measured by the sensing element at least partially disposed in the gas, the $\varepsilon_{gas}$ typically remains substantially constant at both the first frequency and the second frequency of electrical current applied by the frequency modulator. This is so because the gases present in a well bore are typically either monatomic or short-chained hydrocarbon gases, such as helium, hydrogen, hydrogen sulfide, methane, butane, and propane, each with a dielectric constant that typically varies relatively little across a selected range of frequencies. This latter point can be confirmed with empirical tests conducted at the selected frequency, temperature, and pressure ranges on fluid samples from the well bore, calculated numerically, and determined from tables of physical constants.

The measurement is conducted again with the frequency modulator supplying a current at a second frequency, f2.

$$C_{f2}=G_{ins}\varepsilon_0\varepsilon_{ins}L_{water}+G\varepsilon_0\varepsilon_{gas}L_{gas}+G\varepsilon_0\varepsilon_{oilf2}L_{oil}. \quad (19)$$

As discussed above, the response of the dielectric constant of the oil at the various frequencies is known from empirical tests conducted on fluid samples retrieved earlier, calculated numerically, retrieved from tables of physical constants, or assumed from knowledge and experience gained in nearby offset wells. Thus, the level of the oil is calculated by combining and rearranging equations (18) and (19) to solve for the level of the oil. The capacitance of the water and of the gas drops out from the equation, leaving only the two values of the capacitance measured at the two frequencies by the sensing element or elements at least partially disposed in the oil.

$$C_{f1}-C_{f2}=G\varepsilon_0(\varepsilon_{oilf1}-\varepsilon_{oilf2})L_{oil}. \quad (20)$$

Solving for the level of the oil provides:

$$L_{oil}=\frac{(C_{f1}-C_{f2})}{G\varepsilon_0(\varepsilon_{oilf1}-\varepsilon_{oilf2})}. \quad (21)$$

The level of the oil as calculated from equation (21) is substituted into equation (17), resulting in an equation with only two unknowns, that of the level of the water and the level of the gas. These levels are solved by applying the method described in equations (5-16) in Example 2.

EXAMPLE 4

Figure 7:
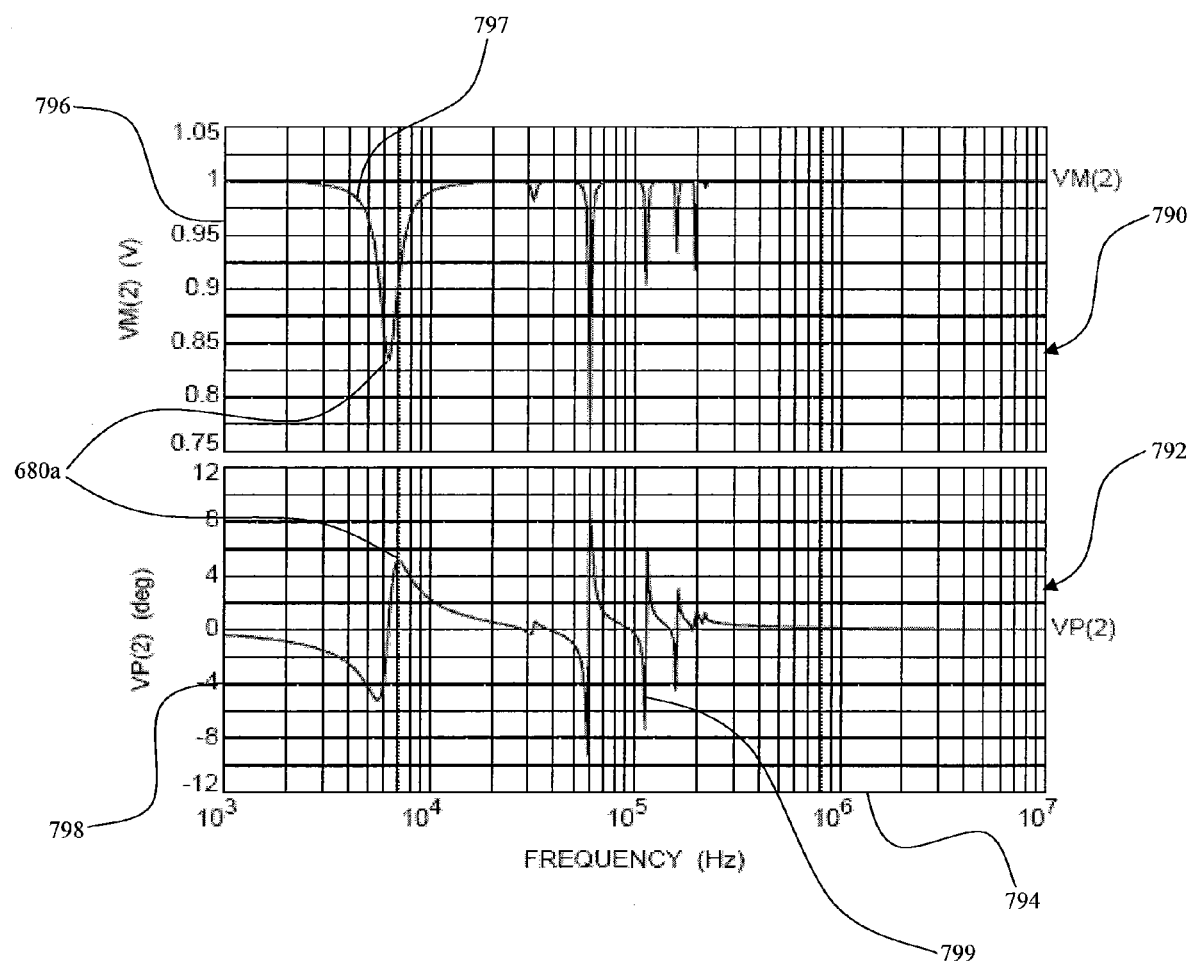
FIG. 7 is a graph of the frequency spectrum response for a modeled sensor.

The output of sensor 400 that includes six (6) element sensors 580*a* to 580*f*, as discussed above with respect to FIG. 6-A, has been numerically modeled, with the modeled frequency response of the sensor graphed in FIG. 7. Graph 790 indicates the magnitude response 797 of the sensor 400, the vertical axis 796 indicating the voltage of the response 797. Graph 792 indicates the phase shift 799 in the frequency supplied to the sensor elements. The phase shift is the shift in frequency, usually measured in degrees, between the frequency as initially applied by the frequency modulator to the sensing element and the frequency as measured upon the return of the electrical current from the sensing element. In other words, the phase shift is the degree (usually given in units of degrees or radians) to which the frequency return signal is out of phase from the applied signal. The vertical axis 798 indicates the phase shift in degrees of the response 797. The horizontal axis 794 for each of graphs 790 and 792 is the initial frequency supplied in hertz by the frequency modulator to the sensing element, in this instance over the range of approximately 300-30,000 Hz.

The peak 780a is the response of the sensing elements 580a from FIG. 6-A and is illustrated in graph 792 and 794. For clarity, the other peaks in the responses of the sensing elements 580b to 580f are not labeled, but may clearly be seen in graphs 792, 794. Each peak indicates the frequency of the signal permitted to pass through each band stop (sensing elements 580a to 580f).

Figure 8:
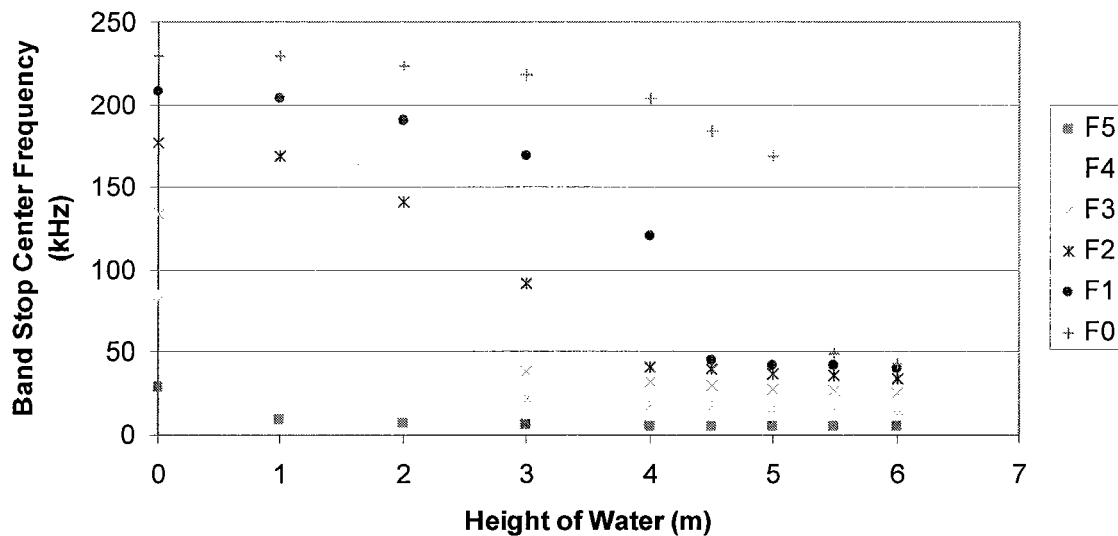
FIG. 8 is a graph of the modeled band stop filter frequencies permitted to pass through an embodiment of the sensing element depicted in FIG. 6-A that is disposed in two different types of fluids.

The frequency that is permitted to pass through each band filter (sensing elements 580a to 580f) is seen in FIG. 8. The response of a sensor 400 disposed in a column of fluid that includes a saline water and gas is modeled, similar to that described in Example 2. The fluid column is 6 m in combined height; the height of the water column is modeled over a range of 0 m of water (i.e., 6 m of gas) to 6 m of water (i.e., 0 m of gas). The height of the water column in meters is plotted on the horizontal axis. The vertical axis indicates the frequency in kilohertz of the signal permitted to pass through each filter of the sensor 400.

The sensor 400 includes six sensing elements, 580a to 580f and labeled F0 to F5. Thus, the response of each individual sensing element 480a to 480f may be seen for the modeled fluid column. For example, when the fluid column is entirely gas (6 m), corresponding to 0 m of water on the horizontal axis, sensing element 580a (F0) permits a frequency of approximately 229 kHz to pass, 580b (F1) 177 kHz, 580c (F3) 134 kHz, 580e (F4) 84 kHz, and 580f (F5) 29 kHz. As the composition of the fluid column changes to include more water and less gas, the frequencies permitted to pass through each filter decreases. For example, if the composition of the fluid column changes to 1 m of water and 5 m of gas, the frequency permitted to pass through the filter formed by each of the sensing elements decreases. In this case, the sensing element 580f (F5) permits a frequency of approximately 9 kHz to pass. Finally, when the entire fluid column is entirely water, represented at the 6 m of water mark on the horizontal axis, the respective frequency permitted to pass through each sensing element is approximately 44 kHz for sensing element 580a (F0), 40 kHz for 580b (F1), 34 kHz for 580c (F2), 26 kHz for 580d (F3), 16 kHz for 580e (F4), and 5 kHz for 580f (F5). As seen in the responses of the sensing elements, as the water content of the fluid column increases the frequencies permitted to pass through each filter decrease toward an asymptote.

By measuring the center frequency of each band stop filter in FIG. 8, an equivalent circuit can be determined that produces the same spectrum. The equivalent circuit is determined by comparing the measured frequencies of the sensing elements disposed in the fluids with the frequencies of various equivalent circuits plotted on pre-generated charts, by inversion modeling, or by calculating a numerical solution to the measured frequencies of the band stop filters. As noted in the discussion of equation (4) above, the response of a sensing element(s) disposed within the water column will have a known dielectric constant that is equal to the dielectric constant of the insulator in the sensing element. From the measured capacitance of each sensing element, the height and type of each of the fluids present is determinable and, thus, the location of the boundary or interface between each type of fluid can be calculated.

EXAMPLE 5

The output of sensor 400 that includes six (6) element sensors 580a to 580f, has been numerically modeled, as in Example 4, but in this instance the fluid column of 6 m combined height includes three different fluids. The fluids include a fixed 2 m column of water and a hydrocarbon column with a variable amount of oil and gas. The height of the oil column in meters is plotted on the horizontal axis of FIG. 9. The hydrocarbon column ranges from 4 m of oil and no gas (i.e., combined fluid column of 2 m of water, 4 m of oil, and 0 m of gas) to no oil and 4 m of gas (i.e., combined fluid column of 2 m of water, 0 m of oil, and 4 m of gas). A combined fluid column including each of the three fluids is also modeled. For example, a combined fluid column of 2 m of water, 2 m of oil, and 2 m of gas, is modeled, among other combinations. The left vertical axis indicates the frequency in kilohertz of the signal permitted to pass through each filter of the sensor 400. The total capacitance in nanofarads as calculated from the sum of the capacitances measured by each of the sensing elements 580a to 580f is indicated on the right vertical axis.

Figure 9:
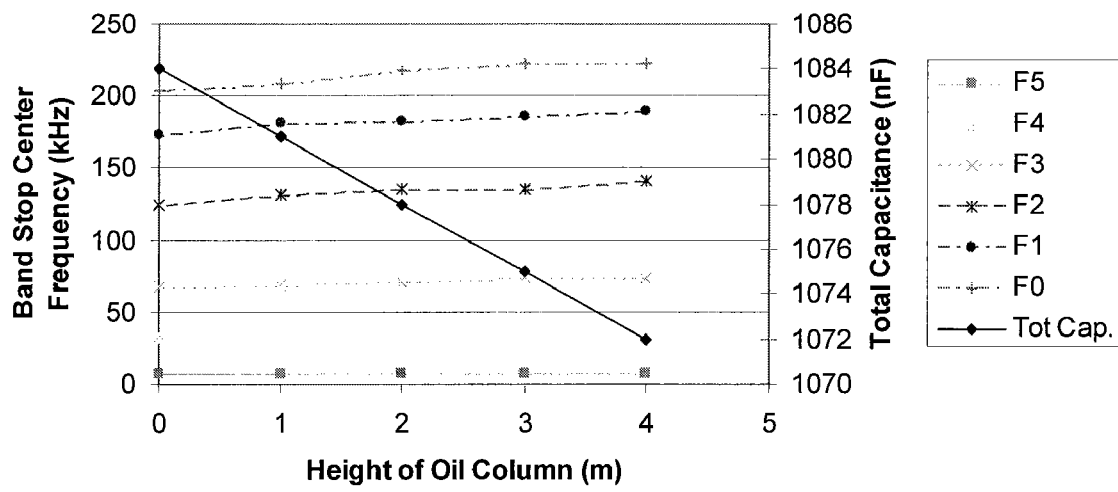
FIG. 9 is a graph of the modeled band stop filter frequencies permitted to pass through an embodiment of the sensing element depicted in FIG. 6-A and the total capacitance measured by the sensing elements disposed in three different fluids.

The response of each individual sensing element 580a to 580f, labeled F0 to F5, is seen for the modeled fluid column in FIG. 9. As seen in FIG. 9, the sensing elements 580e (F4) and 580f (F5), i.e. the sensing elements at the bottom of the sensor 400, are always disposed in the 2 m of water. As mentioned above, the water is at the bottom of the fluid column because it has a greater density relative to the respective densities of the oil and the gas. As such, the measured center frequencies F4 and F5 remain substantially constant throughout this example. The sensing elements 580a to 580d (F0-F3), however, are disposed at various times in either gas or oil. For example, when the hydrocarbon column consists of 100% natural gas, which corresponds to 0 m of oil on the horizontal axis of the chart, the center frequencies of each of the sensing elements 580a (F0), 580b (F1), 580c (F2), and 580d (F3), is seen on the chart, ranging from a frequency of approximately 204 kHz for sensing element 580a (F0) to approximately 68 kHz for sensing element 580d (F3). Also, the center frequency permitted to pass through each sensing element 580a to 580d (F0-F3) increases as the height of the oil column increases and the height of the natural gas column decreases. This response occurs for each of the sensing elements 580a to 580d (F0-F3) even if a particular sensing element remains within the same fluid column as the previous measurement. For example, the measured center frequency for sensing element 580a (F0) is approximately 208 kHz when the sensing element is disposed in part of a natural gas column that is 3 m, which corresponds to an oil column height of 1 m on the horizontal axis. As the height of the gas column decreases to 2 m, corresponding to an oil column height of 2 m on the horizontal axis, the measured center frequency of sensing element 580a (F0) increases to approximately 218 kHz even though it remains disposed in the natural gas column.

The total capacitance as measured by the sensor 400 for each of the hydrocarbon columns is seen in FIG. 9. The total capacitance measured by the sensor decreases as the height of the oil column increases. By measuring the capacitance of each of the sensor elements 580a to 580f, the dielectric constant of the fluid, specifically that of the oil in which the sensor element is disposed, is determined. From the dielectric constant of the oil the composition of the oil and the quality of the oil can be determined by referring back to the results of empirical tests conducted on samples of oil retrieved from a well.

As discussed in Example 4, by measuring the center frequency of each band stop filter in FIG. 9, an equivalent circuit can be determined that produces the same spectrum. The equivalent circuit is determined by comparing the measured frequencies with the frequencies of various equivalent circuits plotted on pre-generated charts, by inversion modeling, or by calculating a numerical solution to the measured frequencies of the band stop filters. As noted in the discussion of equation (4) above, the response of the sensing elements disposed within the water column will have a known dielectric constant that is equal to the dielectric constant of the insulator in the capacitor. From the capacitance measured by each sensing elements, the height and type of the fluid columns is determinable and, thus, the location of the boundary or interface between each type of fluid determined.

EXAMPLE 6

As seen in the previous examples, the type of fluid in which a sensor is disposed affects the frequency that passes through each filter. Thus, if the order of the fluids in the fluid column is altered, the frequencies that pass through each filter changes, which would be apparent in a plot of the frequency spectrum.

Figure 10:
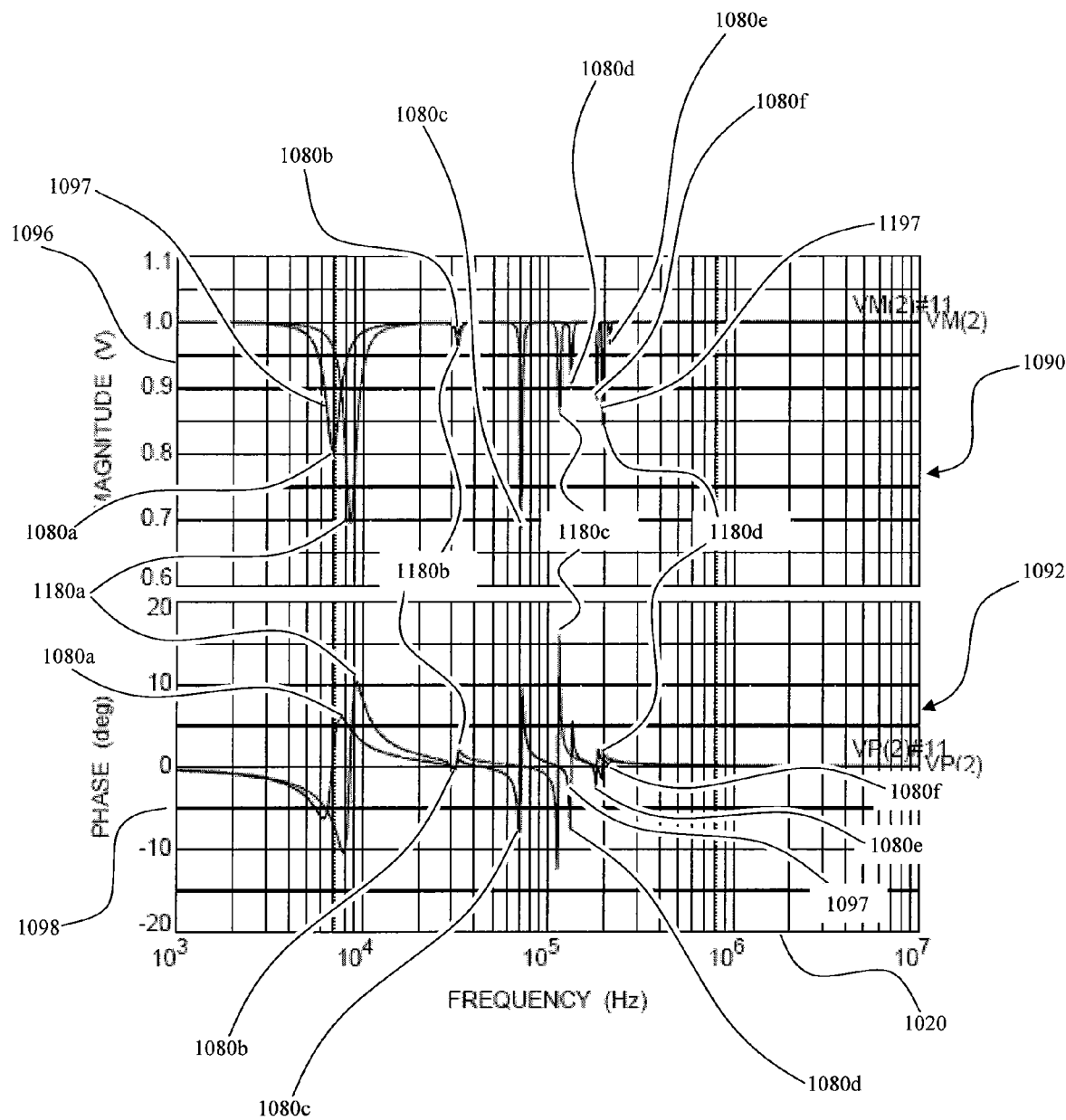
FIG. 10 is a graph of the frequency spectrum response for a modeled sensor under two separate conditions.

In this example, the frequency spectrum of sensor 400 that includes six (6) sensing elements 580a to 580f has been numerically modeled for two conditions in FIG. 10. The first condition models the sensor 400 with the first four sensing elements 580a to 580d disposed in gas and the final two sensing elements 580e and 580f disposed in saline water. Graph 1090 indicates the magnitude response 1097 of the sensor 400, the vertical axis 1096 indicating the voltage of the response 1097. Graph 1092 indicates the phase shift 1099 in the frequency supplied to the sensor, the vertical axis 1098 indicating the phase shift in degrees of the response 1097. The horizontal axis 1094 for each of graphs 1090 and 1092 is the frequency in hertz supplied by the frequency modulator to the sensor 400, in this instance over the range of approximately 100-40,000 Hz.

The peak 1080a is the response of the sensing elements 580a from FIG. 6-A and is seen in graph 1092 and 1094. The peaks 1080e and 1080f are the response of the sensing elements 580e and 580f, both of which are disposed in saline water. The other peaks in the responses of the sensing elements 580b (1080b), 580c (1080c), and 580d (1080d) are also labeled. Each peak indicates the frequency of the signal permitted to pass through each band stop filter (sensing elements 580a to 580f).

The second condition models the sensor 600 with the first two sensing elements, 580a and 580b, and the last two sensing elements, 580e and 580f, disposed in gas, while the middle two sensing elements 580c and 580d are disposed in saline water. Such a situation typically results when a water begins flowing, sometimes referred to as break through, in the middle of a producing zone. Curve 1197 is the magnitude response of the sensor 400 having the sensing elements 580c and 580d disposed in water. Curve 1199 indicates the phase shift in the frequency applied to the sensor and the frequency of the return signal.

The peak 1180a is the response of the sensing elements 580a of the sensor 400 disposed in a gas. Likewise, peak 1180b is the response of the sensing element 580b, also disposed in gas. The peaks 1180c and 1180d are the response of the sensing elements 580c and 580d, both of which are disposed in saline water. Notably, having the sensing elements 580c and 580d disposed in water, as seen in peaks 1180c and 1180d respectively, effectively eliminates the visible response of the sensing elements 580e and 580f from the frequency spectrum. Thus, it is inferred that the water break through occurred below the sensing element 580d and above the sensing element 580e. Since the vertical location of each sensing element placed in a well bore is known, typically because the location of each sensing element along the length of the control line is known and the total length of the control line disposed in the well bore is measured as it is placed in the well, the approximate location of the water break through in the well can be determined. Once the location of a water break is determined, appropriate remedial steps, such as employing a packer to seal off the zone, can be employed.

As example 6 demonstrates, the order of the fluids that each sensing element encounters determines the frequency spectrum of the sensor 400. Thus, the sensor 400 is not only sensitive to the amount of each type of fluid or gas in the column, as seen in examples 4 and 5, the sensor 400 is also sensitive to the order in which the sensor contacts the fluids. Stated differently, the sensor may be used to calculate the relative heights of each type of fluid in a column, as well as the location along the sensor 400 where each fluid contacts the sensor.

Plotting the frequency spectrum provides an additional benefit in that a failing or failed sensing element is detectable. In both instances, the frequency spectrum changes suddenly as a sensing element fails. A change in the location of the fluid contacts is typically expected to occur relatively gradually, leading to a more gradual change in the spectrum than would be expected to occur in the case of a sensor failing. Further, the change in the frequency spectrum allows the exact sensing element that is failing or that has failed to be determined. With this knowledge, the sensor may be replaced in its entirety, in part (i.e., only the failed sensing element replaced), or the measurements compensated to account for the failed sensing element.

Although the foregoing description contains many specifics and examples, these should not be construed as limiting the scope of the present invention, but merely as providing illustrations of some of the presently preferred embodiments. Similarly, other embodiments of the invention may be devised which do not depart from the spirit or scope of the present invention. The scope of this invention is, therefore, indicated and limited only by the appended claims and their legal equivalents, rather than by the foregoing description. All additions, deletions and modifications to the invention as disclosed herein and which fall within the meaning of the claims are to be embraced within their scope.

What is claimed is:

1. A sensor system configured to measure an electrical characteristic of a first fluid and a second fluid of a plurality of fluids in a well bore, said sensor system comprising:

an electrical power supply coupled to and configured to supply electrical power having a voltage and a current alternating at a frequency to the sensor system;

a frequency modulator coupled to the electrical power supply and configured to modulate the frequency of the current supplied by the electrical power supply;

an analog-to-digital converter electrically configured to convert an analog signal representative of the an electrical characteristic of the first fluid to a digital signal representative of the an electrical characteristic of the first fluid;

at least one sensing element connected to said electrical power supply to receive electrical power therefrom, said sensing element including an inner conductive element, a dielectric fixed to and at least partially covering the inner conductive element, and an outer conductive element spaced apart from said dialectic such that the dielectric and the outer conductive element are configured to define a volume, the at least one sensing element further including a means for two of the plurality of fluids to communicate with the volume therein, said at least one sensing element being configured to generate the analog signal and connected to supply the analog signal to the analog-to-digital converter;

a memory storage device coupled to the analog-to-digital converter configured to store the digital signal;

a communication device configured to receive from the memory storage device and to transmit the digital signal;

a processor electrically coupled to the power supply, the frequency modulator, the at least one sensing element, the memory storage device, the communication device, and an output device, the processor being configured to generate an interface signal representative of a location of an interface between the first fluid and the second fluid, and;

an output device positioned for providing perceivable information to a user, the output device being connected to the processor and connected to receive the interface signal, the perceivable information including a discernable indication of the location of the interface between the first fluid and the second fluid.

2. The sensor system of claim 1, wherein the at least one sensing element further comprises a band stop filter.

3. The at least one sensing element of claim 2, further comprising a plurality of sensing elements.

4. The at least one sensing element of claim 3, further comprising at least one of a capacitor, a resistor, and an inductor.

5. The sensor system of claim 1, wherein the dielectric of the at least one sensing element further comprises a dielectric selected for use in a physical environment present in the well bore.

6. The sensor system of claim 5, wherein the dielectric selected for use further comprises a dielectric selected for use in at least one of a selected pressure range and a selected temperature range.

7. The sensor system of claim 6, wherein the dielectric selected for use in at least one of a selected pressure range and a selected temperature range further comprises a dielectric that exhibits a substantially predictable dielectric constant within the selected pressure range and the selected temperature range.

8. The sensor system of claim 6, wherein the dielectric selected for use in at least one of a selected pressure range and a selected temperature range further comprises a dielectric that exhibits a substantially constant dielectric constant within the selected pressure range and the selected temperature range.

9. The sensor system of claim 7, wherein the selected pressure range comprises a smaller, selected pressure range within a range of approximately 14 pounds per square inch (psi) to approximately 30,000 psi and a smaller, selected temperature range within a range of approximately negative 100° F. to approximately 600° F.

10. The sensor system of claim 8, wherein the selected pressure range comprises a smaller, selected pressure range within a range of approximately 14 psi to approximately 30,000 psi and a smaller, selected temperature range within a range of approximately negative 100° F. to approximately 600° F.

11. The sensor system of claim 1, wherein at least one of the at least a plurality of sensing elements is at least partially disposed in a first fluid and at least another one of the sensing elements is at least partially disposed in the at least a second fluid.

12. The sensor system of claim 1, wherein an electrical conductor couples the power supply and the frequency modulator with the plurality of sensing elements.

13. The sensor system of claim 1, wherein the frequency modulator comprises at least one of a an oscillator and a digital frequency modulator.

* * * * *